United States Patent Office

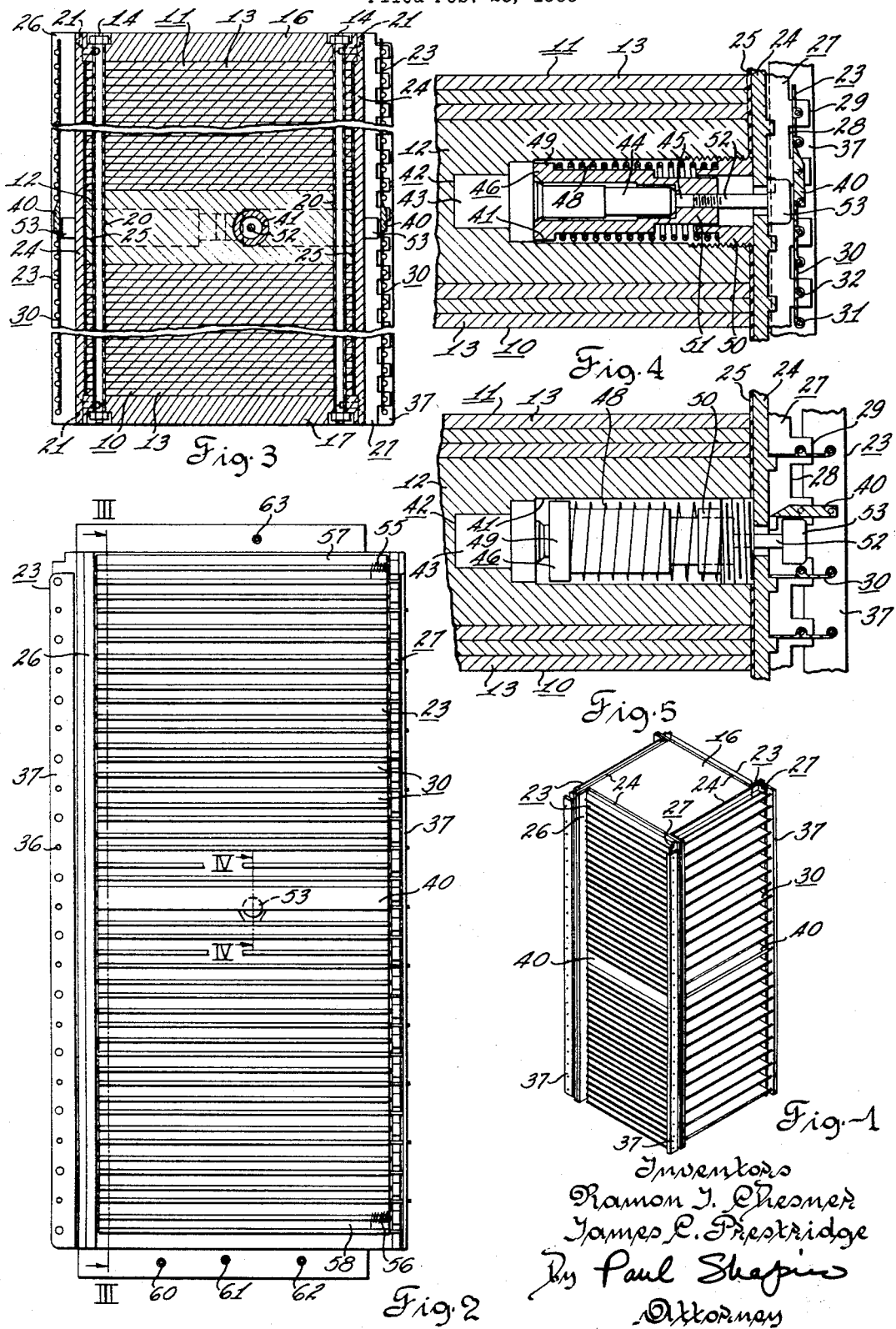

3,441,444
Patented Apr. 29, 1969

3,441,444
FUEL CELL MODULE WITH SHUTTER ASSEMBLY
Ramon J. Chesner, Brookfield, and James C. Prestridge, Menomonee Falls, Wis., assignors to Allis-Chalmers Manufacturing Company, Milwaukee, Wis.
Filed Feb. 23, 1966, Ser. No. 529,280
Int. Cl. H01m 27/18, 27/14
U.S. Cl. 136—86          8 Claims This invention relates to modulating and controlling the operating temperature of fuel cells. More particularly, it relates to an apparatus and method for maintaining fuel cell operating temperature within a desired range.

The term "fuel cell," as used herein, refers to any of those electrochemical devices that convert the free energy of a chemical reaction directly into electrical energy. Such devices are well known in the art and the differences between various types of cells are not material to the understanding or operation of the present invention. The term "fuel cell module" refers to a number of individual fuel cells assembled together for cooperative electrical operation.

Although fuel cells are a very efficient means for converting chemical to electrical energy, the conversion is never 100 percent efficient and the inefficiency does produce some heat. Furthermore, each type fuel cell operates most efficiently within a temperature range especially selected for the electrochemical reactions, catalysts, and waste removal systems chosen for use in conjunction with that cell. For example, fuel cells that utilize the system to remove product water disclosed in United States patent application Ser. No. 301,077, filed Aug. 9, 1963, are found to operate most effectively from about 195° to about 210° F.

In the vast majority of cases, the optimum temperature range for operation of any fuel cell exceeds the temperature of the surrounding environment, and the excess heat produced by the cell is disposed of by transfer to this surrounding environment. However, temperature control is needed so that only heat in excess of that required to maintain the cell near the optimum operating temperature is disposed of. Also, it becomes apparent that when starting a cold cell, conservation of waste heat is desirable until operating temperature is reached. In addition, the amount of heat produced is a fuel cell varies with the amount of electrical power being produced by the cell. Most fuel cell applications require operation over a wide range of electrical output which necessitates variation of the rate of heat dissipation to maintain optimum cell temperature.

When used as an electrical power supply for space vehicles, a fuel cell module should have the ability to operate in the earth's atmosphere during testing and prelaunch as well as in space vacuum. This requires that the fuel cell module have a variable thermal control system to compensate for the higher rate of heat dissipation in air.

In the past, temperature control of fuel cells has variously been achieved. One means of dissipating excess heat from a fuel cell stack is to provide fins about the periphery of the cells. Unfortunately, since fins must have a fixed unalterable surface area available for heat transfer, the rate of heat transfer to the surrounding environment cannot be varied. Therefore, when fins are used exclusively to provide cooling, the design must be compromised to meet the average expected operating conditions. Also, the application of such a fuel cell is limited to a relatively small range of power output and environmental conditions. When power output or environmental conditions deviate from that for which the fins are designed, the fuel cell module runs hotter or colder than the designed optimum temperature.

Another means of achieving temperature control is to circulate a fluid, either a liquid or a gas, about the fuel cell stack. Fins about the periphery of the cells are used to increase the surface area exposed to the fluid. Excess heat is transferred to this fluid.

For some applications, the cooling fluid may be air. Fans must be provided to control air circulation. Unless the temperature of the air is controlled, satisfactory operation with this type of cooling is limited to an abnormally narrow range of ambient temperature.

Other designs using a circulated fluid for thermal control of a fuel cell power supply utilize a closed-loop cooling system. The fluid must either be electrically nonconducting or electrically isolated from the fuel cell stack. After the cooling fluid is circulated about the fuel cell stack, it is then circulated through a heat-exchanger where the heat is dissipated from the fluid to the heat-exchanger surroundings. The cooled fluid is then returned to the fuel cell module to resume the process of removing excess heat from the fuel cells.

The closed-loop cooling system must contain components for circulating the fluid and controlling the pressure, temperature and flow rate of the fluid. Operation of these components requires electrical power which increases the parasitic power requirements of the fuel cell power system, and therefore, decreases the amount of usable power produced by the power system. The additional operating components of the closed-loop cooling system and the possibility of leakage decreases the reliability of the fuel cell power system and increases the cost of the system.

The fluid, tubing, controls and radiators required for this means of thermal control also add considerable weight and volume to the fuel cell power system which are particularly important in space applications.

When starting a cold cell, it is desirable to reach the operating temperature as rapidly as possible. Having a heat transfer fluid about the cell slows the rate of heating and delays the cell from reaching operating temperature because heat is unnecessarily dissipated into the cold heat transfer fluid contained about the cell.

Another disadvantage with this system is that when the cooling medium is a liquid, a leak in the cooling system could not only cause failure of the cooling system and the fuel cell module, but also could spill over and possibly harm nearby equipment, particularly in a space vehicle.

The disadvantages of the prior art thermal control systems are avoided in accordance with the present invention, wherein there is provided a fuel cell module, such for example as a stack of series connected cells having mounted on the outer edges of the stack a plate backed shutter assembly having shutter louvers which are activated to open and close in response to temperature changes in the module by temperature sensitive actuators located within the fuel cell module providing a thermal control system for the module.

As power is demanded from the module, the cells heat up and as the temperature of the cells approaches a maximum required for efficient operation, the shutter louvers are activated to open by the temperature sensitive actuators located within the module and heat is dissipated from the module by radiation. As the cells of the module cool, the temperature sensitive actuators, in response to the temperature change, permit the shutters to close reducing the amount of heat lost by radiation and thereby controlling the temperature of the cell. The thermal control system of the present invention is simple to construct and provides an efficient, reliable means of controlling the temperature of a fuel cell module. The system is light-weight and compact and eliminates the need for parasitic electrical power required by prior art thermal control systems. The thermal control system of the present invention also eliminates the need for pumps, fans, valves, radiators, coolant and tubing required by other means of fuel cell thermal control.

The invention in its preferred embodiments will be better understood from the following description and claims, when read in conjunction with the accompanying drawing in which:

FIG. 1 is an isometric view of a fuel cell module embodying the temperature modulating arrangement of the invention wherein in response to a rise in temperature in the fuel cell module the louvers of a shutter assembly of the fuel cell module have been activated to open by temperature sensitive actuators located within the fuel cell module;

FIG. 2 is a side elevation view of the fuel cell module showing the louvers of a shutter assembly in a closed position;

FIG. 3 is a sectional view taken along lines III—III of FIG. 2 showing the temperature sensitive actuators positioned within a spacer plate within the fuel cell module;

FIG. 4 is an enlarged sectional view taken along line IV—IV of FIG. 2 showing a temperature sensitive actuator in section with the louvers of the shutter assembly in a closed position; and FIG. 5 is an enlarged sectional view similar to FIG. 4 with the louvers of the shutter assembly in an open position.

Referring to the drawings, the system shown comprises two groups of fuel cell stacks 10, 11 separated by spacer plate 12. Each fuel cell stack is comprised of a plurality of identical individual fuel cells 13. The fuel cells 13 are pressed together by tie bolts 14 which pass through recessed holes in end plates 16, 17 and aligned holes in the edges of the plates making up the fuel cell stack and are insulated from the fuel cell plates by insulating sleeve 20. Suitable means are provided (not shown) for the supply and removal of reactants and exhaust products to and from the fuel cell module through ports 60, 61, 62 and 63 in the end plates 16, 17.

To each of the four outer faces of the end plates 16, 17 are attached as by connecting screws 21, a shutter assembly 23. Each shutter assembly contains a heat transfer panel 24. The heat transfer panel 24 is electrically insulated from the plates of the fuel cell stack by dielectric insulation 25.

Spaced apart vertical side members 26, 27 are attached to the opposite sides of heat transfer panel 24 by suitable means such as screws. Side member 27 contains notches 28 along its upper edge with raised portions 29 therebetween. A plurality of shutter louvers 30 having lengthwise support sleeves, lower sleeve 31 and midsection sleeve 32 along the lower edge and midsection of the louver are arranged in spaced relation between side members 26, 27. The louvers 30 are pivotally mounted between opposite side members 26, 27 by a pivot rod running through the midsection sleeve 32 and journaled into transverse openings in the sides of member 26 and the raised portions of side member 27. A second pivot rod placed in lower support sleeve 31 protrudes from one side of the louver and is journaled for rotation in bearing bushes positioned in bearing apertures 36 in actuator arm 37. The louvers are thus supported at their ends for pivotal movement. The actuator arm 37 pivotally interconnects the louvers of the shutter assembly and causes the louvers, when activated, to move in unison.

Actuator louver 40 is a shutter louver having a relatively greater thickness than any of the other shutter louvers and is pivotally mounted between side members 26, 27 and pivotally connected to actuator arm 37 at a point on the shutter assembly in a position generally parallel to spacer plate 12 in a manner similar to louver 30.

The outer surface of the heat transfer panel 24 is coated with a material having a high thermal emissivity so that when the shutters are activated to the open position, heat conducted to the panel from the fuel cell stacks is rapidly dissipated from the surface of the panel to the surrounding environment. Coatings having high emissive power are known to the art and include paints, lacquers, and enamels. The total emissivities of a variety of coating materials may be found at page 2244 of the "Handbook of Chemistry and Physics," 30th Edition (1947), published by the Chemical Rubber Publishing Company, Cleveland, Ohio.

Conversely, the louvers of the shutter assembly are formed from, or their outer surfaces coated with, a material having a low thermal emissivity such as a polished metal, so that when the shutters are closed, heat is retained. Additionally for certain applications, the shutters may be made of a thermally insulating material such as glass fiber filled phenolic resin. Preferably, where weight considerations are an important factor such as in space applications, the louvers of the shutter assembly are constructed of a polished light-weight metal such as polished aluminum or magnesium.

The spacer plate 12, contains bores 41 at a point substantially in the midsection of each of the four sides of the plate. Positioned within the bores 41 are temperature sensitive actuators 42. Temperature sensitive actuator 42 is comprised of a thermal material container 43 at one end, a neck 44 at the other end from which projects piston 45. The thermal material contained in container 43 consists of a material such as paraffin wax which expands and contracts at a controlled rate over a specific temperature range. Expansion of the thermal material forces the piston 45 out of the neck 44 of the actuator 42. Temperature sensitive actuators of the type employed in the embodiment of the present invention illustrated in the drawings are available on the market under the trade name "Vernatherm" manufactured by the American Radiator and Standard Sanitary Supply Corporation.

Spring retainer 46 is slidably mounted over neck 44 and piston 45. Compression spring 48 is concentrically disposed about spring retainer 46, one end of the spring 48 being biased against flange 49 of retainer 46. Spring stop 50, which is slidably mounted over collar 51 of retainer 46 and threaded into spacer plate 12 preloads and retains spring 48.

Adjustment screw 52 extends through a hole drilled in thermal plate 24 and is threaded into collar 51 of retainer 46 and contacts piston 45 of actuator 42. Actuator button 53 is threaded onto adjustment screw 52 and contacts actuator louver 40 at a point off the pivot axis of the actuator louver 40.

During operation of the fuel cell module, as the fuel cell stack warms up to exceed the selected lower limit for optimum operating temperature, for example 195° F., the temperature rise causes the thermal material in the temperature sensitive actuator 42 to expand. Expansion of the thermal material in the temperature sensitive actuator 42 causes the piston 45 to move outward against adjustment screw 52. This causes spring retainer 46 to move outward compressing spring 48 and forcing adjustment screw 52 and the attached actuator button 53 toward and against actuator louver 40. As actuator button 53 is forced against actuator louver 40, the actuator louver 40 is caused to pivot about its axis through a 90° angle, which pivoting in turn causes the actuator arm 37 to be raised and moved through a 90° arc. The activation of the actuator arm 37 causes the louvers 30 interconnected therewith to be pivoted about their axis through a 90° angle and the shutter assembly is thereby activated into the open position. The opening of the louvers of the shutter assembly allows the heat developed in the fuel cell stacks to be dissipated by radiation from the outer walls of the heat transfer panel 24. The expansion of the thermal element of the temperature sensitive actuator 42 increases as the temperature of the module increases thereby causing the shutter opening to increase until at the selected upper limit for optimum operating temperature, the shutters are at the 90° fully open position allowing the heat to be rapidly dissipated by radiation from the outer walls of the heat transfer panel 24. As the cold module is put into operation, it is desirable to conserve heat so that the fuel cell stacks reach operating temperature as quickly as possible. Hence as the fuel cell module is put into operation, the piston 45 is initially in a retracted position within the neck 44 of the temperature sensitive actuator 42.

As the dissipation of heat through the opened louver shutters causes the temperature to fall within the module or the internal heat generation of the module is reduced by a lowering of the electrical power output of the fuel cell stack, the rapid dissipation of heat through the opened louvers of the shutter assembly causes the module temperature to decrease. The thermal sensitive material within the temperature actuator 42 contracts and compression spring 48 causes spring retainer 46 to move inward causing piston 45 to retract into neck 44 of the temperature sensitive actuator 42 and retracting adjustment screw 52 and the attached actuator button 53.

Resilient means such as torsion springs 55, 56 are mounted on the terminal louvers 57, 58 to bias the terminal louvers and the interconnected louvers 30 to a closed position. Upon the retraction of the button 53, the torsion springs 55, 56 having no opposing force, cause the terminal shutters 57, 58 and the louvers 30 interconnected therewith to move toward the closed position thereby reducing the amount of heat radiated from the outer walls of the thermal plate 24. The contraction of the thermal material in the temperature sensitive actuator 42 continues as the temperature of the module decreases thereby causing the shutter opening to decrease until either the lower selected limit of optimum operating temperature is reached and all the louvers are in the fully closed position, allowing maximum retension of heat, or until thermal equilibrium is reached.

The embodiments of the invention in which an exclusive property or privilege is claimed are defined as follows:

1. An apparatus for controlling the operative temperature of a fuel cell by controlling the radiation of heat from the cell comprising in combination, a fuel cell module comprising a stack of cooperating fuel cells, at least one shutter assembly mounted on said fuel cell module, said shutter assembly comprised of a heat transfer panel having pivotally mounted on the outer face thereof a plurality of parallel louvers arrranged to open and colse, the inner face of said heat transfer panel abutting and dielectrically insulated from the outer surfaces of the fuel cell module, a temperature sensitive means having a movable portion thereof responsive to temperature changes in the fuel cell module, an actuating member connected to open and close the louvers of said shutter assembly, the actuating member being adapted to be activated to open the louvers of the shutter assembly by the movable portion of said temperature sensitive means and resilient means connected to the louvers of said shutter assembly to bias the louvers to a closed position.

2. The apparatus of claim 1 wherein the outer face of the heat transfer panel is coated with a material having a high thermal emissivity.

3. The apparatus of claim 1 wherein the louvers of the shutter assembly are formed from a material having a low thermal emisssivity.

4. The apparatus of claim 1 wherein the louvers of the shutter assembly are formed from polished aluminum.

5. The apparatus of claim 1 wherein the louvers of the shutter assembly are formed from a thermally insulating material.

6. The apparatus of claim 1 wherein the outer face of the heat transfer panel is coated with a material having a high thermal emissivity and the louvers are formed from a material having a low thermal emissivity.

7. The apparatus of claim 1 wherein the temperature sensitive means is positioned within the fuel cell module in spaced relation to the stacks thereof.

8. The apparatus of claim 1 wherein the movable portion of the temperature sensitive means is responsive to a material contained within the temperature sensitive means which expands and contracts at a controlled rate over a specific temperature range.

References Cited

UNITED STATES PATENTS

| | | | |
|---|---|---|---|
| 3,099,587 | 7/1963 | Chambers et al. | 136—86 |
| 3,150,657 | 9/1964 | Shultz et al. | 136—86 |
| 3,236,691 | 2/1966 | Reger et al. | 136—86 |

ALLEN B. CURTIS, *Primary Examiner.*